US012434259B2

(12) United States Patent
Liu et al.

(10) Patent No.: US 12,434,259 B2
(45) Date of Patent: Oct. 7, 2025

(54) COATING DIE HEAD AND COATING EQUIPMENT HAVING SAME

(71) Applicant: CONTEMPORARY AMPEREX TECHNOLOGY (HONG KONG) LIMITED, Hong Kong (CN)

(72) Inventors: Xuyong Liu, Ningde (CN); Jingjing Pu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/042,786

(22) Filed: Jan. 31, 2025

(65) Prior Publication Data

US 2025/0178018 A1 Jun. 5, 2025

Related U.S. Application Data

(63) Continuation of application No. PCT/CN2023/122589, filed on Sep. 28, 2023.

(30) Foreign Application Priority Data

Oct. 8, 2022 (CN) ......................... 202222624402.1

(51) Int. Cl.
*B05C 5/02* (2006.01)
*B05C 11/10* (2006.01)

(52) U.S. Cl.
CPC .......... *B05C 5/0258* (2013.01); *B05C 5/0266* (2013.01); *B05C 11/10* (2013.01)

(58) Field of Classification Search
None
See application file for complete search history.

(56) References Cited

U.S. PATENT DOCUMENTS 4,299,186 A * 11/1981 Pipkin .................. B05C 5/0254 118/410
4,440,105 A * 4/1984 Jeltema ................ B05C 5/0266 118/410

(Continued)

FOREIGN PATENT DOCUMENTS

CN 209697340 U 11/2019
CN 111760757 A 10/2020

(Continued)

OTHER PUBLICATIONS

International Search Report for International application No. PCT/CN2023/122589 filed Sep. 28, 2023 on behalf of Contemporary Amperex Technology Co., Limited, Mail Date: Nov. 13, 2023, Original document + English translation, 10 pages.

(Continued)

*Primary Examiner* — Jethro M. Pence
(74) *Attorney, Agent, or Firm* — K&L Gates LLP

(57) ABSTRACT

A coating die head includes a die head body, a cavity pressure adjusting block and a regulating assembly. A material cavity is arranged in the die head body, and a first wall surface of the material cavity has a through hole. The cavity pressure adjusting block is arranged in the material cavity, the cavity pressure adjusting block comprises a cavity that is located inside the cavity pressure adjusting block, the cavity pressure adjusting block is configured to change a volume with a pressure change of the cavity, one side wall surface of the cavity pressure adjusting block facing towards the first wall surface is a second wall surface, and the second wall surface is fitted with the first wall surface and surrounds a region where the through hole is located. The coating die head may be integral to a coating equipment.

18 Claims, 4 Drawing Sheets

(56) References Cited

U.S. PATENT DOCUMENTS

| | | | | |
|---|---|---|---|---|
| 4,521,268 | A * | 6/1985 | Bok | H01L 21/67784 118/728 |
| 4,844,004 | A * | 7/1989 | Hadzimihalis | B05D 1/26 118/411 |
| 5,318,804 | A * | 6/1994 | Yoshida | G11B 5/848 118/409 |
| 5,503,336 | A * | 4/1996 | Wichmann | B05B 5/0255 239/590.5 |
| 6,688,580 | B2 * | 2/2004 | Jackson | B05C 5/0258 141/117 |
| 8,752,501 | B2 * | 6/2014 | Joos | B29C 48/313 118/410 |
| 8,770,141 | B2 * | 7/2014 | Ikagawa | B05C 5/0258 118/682 |
| 8,771,793 | B2 * | 7/2014 | Wilsey | B05C 11/1005 427/296 |
| 9,016,235 | B2 * | 4/2015 | Ikagawa | B05C 11/1007 427/427.2 |
| 9,238,245 | B2 * | 1/2016 | Ishii | H01L 21/6715 |
| 9,296,010 | B2 * | 3/2016 | Watanabe | B05C 5/0208 |
| 9,401,291 | B2 * | 7/2016 | Mimura | H01L 21/67253 |
| 9,682,395 | B2 * | 6/2017 | Park | B05C 9/10 |
| 9,687,872 | B2 * | 6/2017 | Joos | B29C 48/313 |
| 10,207,284 | B2 * | 2/2019 | Li | B05B 13/0278 |
| 12,202,005 | B2 * | 1/2025 | Park | H01M 4/0409 |
| 2011/0223337 | A1 * | 9/2011 | Yanagawa | B05D 1/265 427/350 |
| 2012/0027942 | A1 | 2/2012 | Joos | |
| 2013/0260046 | A1 * | 10/2013 | Komatsubara | B05C 11/1013 118/712 |
| 2018/0229259 | A1 * | 8/2018 | Shao | B05C 5/0237 |
| 2018/0333739 | A1 * | 11/2018 | Miyata | B05C 11/023 |
| 2023/0158525 | A1 * | 5/2023 | Martin | B05B 9/0409 118/300 |
| 2023/0356258 | A1 * | 11/2023 | Liu | B05C 5/0262 |
| 2024/0001396 | A1 * | 1/2024 | Nishio | B05C 11/1007 |

FOREIGN PATENT DOCUMENTS

| | | | | |
|---|---|---|---|---|
| CN | 111774250 A | | 10/2020 | |
| CN | 213102968 U | | 5/2021 | |
| CN | 216880143 U | * | 7/2022 | Y02E 60/10 |
| CN | 218167601 U | | 12/2022 | |

OTHER PUBLICATIONS

Written Opinion for International application No. PCT/CN2023/122589 filed Sep. 28, 2023 on behalf of Contemporary Amperex Technology Co., Limited, Mail Date: Nov. 13, 2023, Original document + English translation, 7 pages.

* cited by examiner

COATING DIE HEAD AND COATING EQUIPMENT HAVING SAME

CROSS-REFERENCE TO RELATED APPLICATIONS

This application is a continuation of International Application PCT/CN2023/122589, filed on Sep. 28, 2023, which claims priority to Chinese Patent Application No. 202222624402.1, filed on Oct. 8, 2022, both of which are incorporated herein by reference in their entireties.

TECHNICAL FIELD

This application relates to the technical field of coating, and in particular, to a coating die head and coating equipment having the same.

BACKGROUND

In the production process of battery cells, both positive and negative electrode plates are made using a coating process. The coating weight is closely related to the safety of the battery cells, which is one of the key control points for the production of the battery cells. However, the coating weights of different models of battery cells are greatly different, slurries used by different battery cells are also different, there are different conditions in the production process, and the above conditions will lead to different pressure of a material cavity of a coating die head. When the pressure of the material cavity is unstable, it will affect the conveying state of the slurry, and thus affect the consistency of the coating weight. Under normal conditions, when the pressure of the material cavity fluctuates, it is necessary to replace a coating die head with a suitable material cavity, or clean the slurry settling in the material cavity, or replace the slurry to solve the problem, so as to improve the quality of the electrode plates. However, this will cause serious material loss, and also reduce the efficiency of the process and increase the manufacturing cost.

SUMMARY

The embodiments of this application provide a coating die head and a piece of coating equipment having the same, which can effectively solve the problem of pressure fluctuation in a material cavity, alleviate the problem of seepage, reduce material loss, improve process efficiency and reduce manufacturing cost.

According to a first aspect, an embodiment of this application provides a coating die head, including: a die head body, a material cavity being arranged in the die head body, and a first wall surface of the material cavity having a through hole; a cavity pressure adjusting block, the cavity pressure adjusting block being arranged in the material cavity, the cavity pressure adjusting block being internally provided with a cavity, the cavity pressure adjusting block being configured to change a volume with a pressure change of the cavity, one side wall surface of the cavity pressure adjusting block facing towards the first wall surface being a second wall surface, and the second wall surface being fitted with the first wall surface and surrounding a region where the through hole is located; and a regulating assembly, the regulating assembly being adapted to communicate with the cavity through the through hole and being used for conveying fluid into the cavity or extracting fluid from the cavity to adjust the volume of the cavity pressure adjusting block by changing pressure of the cavity. In the above technical solution, the problem of fluctuation of the coating weight can be effectively alleviated, the problem of seepage can be avoided, material loss is reduced, process efficiency is improved, and manufacturing cost is reduced.

In some embodiments, the cavity pressure adjusting block is detachably connected to the die head body. In the above technical solution, different cavity pressure adjusting blocks can be replaced according to requirements to meet different actual requirements.

In some embodiments, the cavity pressure adjusting block is detachably connected to the die head body by a threaded connector arranged on the first wall surface and the second wall surface in a penetrating manner. In the above technical solution, the cavity pressure adjusting block is convenient to disassemble and replace, the installation stability of the cavity pressure adjusting block can be improved, and good fit between the first wall surface and the second wall surface is ensured.

In some embodiments, a plurality of cavity pressure adjusting blocks are provided and arranged in sequence along a length direction of the material cavity. In the above technical solution, the volume of each cavity pressure adjusting block is relatively small, the regulating assembly can easily adjust the volume change of each cavity pressure adjusting block, and adjustment precision is high.

In some embodiments, one cavity pressure adjusting block is provided, and a length direction of the cavity pressure adjusting block is parallel with a length direction of the material cavity. In the above technical solution, the cavity pressure adjusting block is simple in structure, convenient to machine, and convenient to assemble, disassemble and replace, and can reduce cost.

In some embodiments, cavity pressure adjusting blocks are arranged at two ends of the material cavity along the length direction respectively. In the above technical solution, the set positions of the cavity pressure adjusting blocks have little influence on material passing, and the flow uniformity of a slurry in the material cavity is improved.

In some embodiments, the die head body has a discharge port and a feed port communicating with the material cavity, and when the cavity pressure adjusting block is configured to expand to a limit state, a material passing space communicating with the feed port and the discharge port is still provided between the cavity pressure adjusting block and the material cavity. In the above technical solution, the flow uniformity of the slurry in the material cavity can be improved, the phenomenon of local gel settling is improved, and the consistency of the coating weight is improved.

In some embodiments, the die head body has the discharge port communicating with the material cavity, the cavity pressure adjusting block is arranged on one side inside the material cavity, the side is away from the discharge port, or the cavity pressure adjusting block is arranged in a middle position of the material cavity. In the above technical solution, the influence of the cavity pressure adjusting block on the discharge uniformity can be reduced, and thus the consistency of the coating weight is improved.

In some embodiments, the die head body includes a plurality of die head units and a gasket arranged between each two adjacent die head units, the gasket includes a sheet body portion and a notch portion, discharge slits are formed between the gasket and the corresponding two die head units through the notch portion, and the cavity pressure adjusting block is arranged corresponding to the sheet body portion. In the above technical solution, the provision of the cavity pressure adjusting block can recede the discharge slits, and thus the influence of the cavity pressure adjusting block on the discharge uniformity can be reduced, and the consistency of the coating weight is improved.

In some embodiments, the regulating assembly includes a pressure regulator and a flow channel tube, the pressure regulator is arranged on the flow channel tube, and the flow channel tube is arranged on the through hole in a penetrating manner and communicates with the cavity. In the above technical solution, the regulating assembly is simple in structure and low in cost, the regulating assembly can conveniently communicate with the cavity of the cavity pressure adjusting block by provision of the flow channel tube arranged on the through hole in a penetrating manner, the assembling difficulty of the regulating assembly is reduced, and the problem of seepage can be further alleviated.

In some embodiments, each cavity pressure adjusting block is correspondingly connected to at least one flow channel tube. In the above technical solution, each cavity pressure adjusting block can simply and effectively have an effective and rapid volume adjustment effect.

In some embodiments, a plurality of flow channel tubes and a plurality of cavity pressure adjusting blocks are provided and are arranged in a one-to-one correspondence manner. In the above technical solution, connection is facilitated, cost is reduced, and each cavity pressure adjusting block has an effective and rapid volume adjustment effect.

In some embodiments, a plurality of pressure regulators are provided and arranged in a one-to-one correspondence with the plurality of flow channel tubes. In the above technical solution, independent adjustment of each cavity pressure adjusting block can be achieved.

In some embodiments, at least two of the flow channel tubes are arranged corresponding to the same pressure regulator. In the above technical solution, simultaneous adjustment of at least two of the cavity pressure adjusting blocks can be achieved, and thus control is simplified, and cost is reduced.

In some embodiments, the regulating assembly further includes a communicating tube, and the communicating tube is arranged in the material cavity and communicates with the cavities of the plurality of cavity pressure adjusting blocks. In the above technical solution, the quantities of the pressure regulators and the flow channel tubes can be reduced, control is simplified, and the assembling space is saved.

In some embodiments, the cavity pressure adjusting block has an opening arranged corresponding to the through hole, the opening communicates with the cavity, the opening is provided with an anti-reverse-flow element, an end portion of the flow channel tube is adapted to extend into the cavity through the anti-reverse-flow element and the opening, and the anti-reverse-flow element is used for closing the opening when the flow channel tube is withdrawn from the opening. In the above technical solution, by provision of the anti-reverse-flow element, fluid can be prevented from overflowing from the opening, and stable pressure of the cavity is ensured.

In some embodiments, the flow channel tube is provided with a pressure gauge. In the above technical solution, when the flow channel tube is inserted into the opening, the pressure in the cavity pressure adjusting block can be monitored in real time through the pressure gauge, which is conducive to the effective adjustment of the volume of the cavity pressure adjusting block.

In some embodiments, the coating die head further includes: a detection apparatus, including a pressure sensor used for detecting pressure of the material cavity, and a sensing head of the pressure sensor is exposed to the material cavity. In the above technical solution, the pressure of the material cavity is detected by the pressure sensor, which is conducive to adjusting the volume of the cavity pressure adjusting block, thereby being conducive to online adjustment of the pressure of the material cavity.

In some embodiments, at least one pressure sensor is installed on the cavity pressure adjusting block. In the above technical solution, it is conducive to ensuring pressure detection accuracy of the pressure sensor.

In some embodiments, the detection apparatus includes a plurality of pressure sensors arranged at intervals along the length direction of the material cavity. In the above technical solution, it is conducive to ensuring uniform pressure of the material cavity and improving the consistency of the coating weight.

In some embodiments, the detection apparatus is electrically connected to the regulating assembly, so that the regulating assembly can perform corresponding adjustment according to the pressure of the material cavity detected by the pressure sensor. In the above technical solution, automatic pressure adjustment can be achieved, manual operation is eliminated, and the consistency of the coating weight is conveniently and reliably ensured.

In some embodiments, the material cavity is divided into a plurality of regions, each region is correspondingly provided with at least one of the pressure sensors, and each region is correspondingly provided with at least one of the cavity pressure adjusting blocks. In the above technical solution, the regulating assembly can adjust the cavity pressure adjusting block on the corresponding region according to the pressure sensor of each region, and thus the volume of each cavity pressure adjusting block can be adjusted specifically to achieve the stable and uniform effect of controlling the pressure of the material cavity.

In some embodiments, the coating die head further includes: a guide member, the guide member being arranged in the material cavity and used for guiding the cavity pressure adjusting block to expand directionally. In the above technical solution, the cavity pressure adjusting block can expand directionally instead of expanding irregularly, and thus different design requirements are met.

In some embodiments, the cavity pressure adjusting block is a rubber member or a silica gel member. In the above technical solution, the better cavity pressure adjustment effect is achieved, the service life is long, and the better sealing and seepage prevention effect can be achieved.

According to a second aspect, an embodiment of this application further provides a piece of coating equipment, including the coating die head described above.

BRIEF DESCRIPTION OF DRAWINGS

To describe the technical solutions in embodiments of this application more clearly, the following outlines the drawings to be used in embodiments. It should be understood that the drawings below are merely some embodiments of this application and should therefore not be regarded as limiting the scope. A person of ordinary skill in the art may derive other related drawings from such drawings without making any creative efforts.

Figure 1:
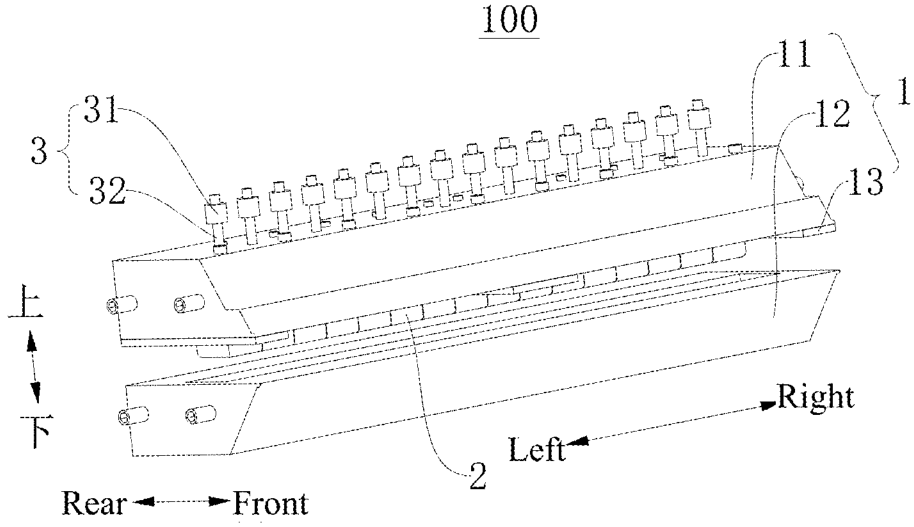
FIG. 1 is an exploded structural diagram of a coating die head according to some embodiments of this application.

Reference numerals: 100—Coating die head; 1—Die head body; 10—Material cavity; 101—First wall surface; 102—Through hole; 103—Material passing space; 11—Upper die head; 12—Lower die head; a—Die head unit; 13—Gasket; 131—Sheet body portion; 132—Notch portion; 14—Discharge slit; 15—Feed port; 16—Discharge port; 2—Cavity pressure adjusting block; 20—Cavity; 21—Second wall surface; 22—Opening; 23—Matching hole; 3—Regulating assembly; 31—Pressure regulator; 32—Flow channel tube; 33—Pressure gauge; 4—Pressure sensor; 5—Anti-reverse-flow element; and 6—Guide member.

DETAILED DESCRIPTION OF EMBODIMENTS

To make the objectives, technical solutions, and advantages of embodiments of this application clearer, the following gives a clear description of the technical solutions in the embodiments of this application with reference to the accompanying drawings in the embodiments of this application. Apparently, the described embodiments are merely a part of but not all of the embodiments of this application. Based on the embodiments in this application, all other embodiments obtained by a person of ordinary skill in the art without creative labor fall within the scope of protection of this application.

Unless otherwise defined, all technical and scientific terms used in this application have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of accompanying drawings of this application are intended as non-exclusive inclusion. The terms "first", "second", etc. in the specification and claims of this application or in the accompanying drawings described above are used to distinguish between different objects, and are not used to describe a particular order or relationship of priority.

Reference to "embodiment" herein implies that particular features, structures, or characteristics described in conjunction with an embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, it is hereby noted that unless otherwise expressly specified and defined, the terms "mount", "connected", "connection", and "attach" are understood in a broad sense. For example, it may be a fixed connection, a detachable connection, or an integrated connection; or may be a direct connection or an indirect connection implemented through an intermediary; or may be internal communication between two components. To a person of ordinary skill in the art, the specific meaning of the above terms in this application may be understood according to specific situations.

The term "and/or" in this application indicates merely a relation for describing the related items, and represents three possible relationships. For example, A and/or B may represent the following three circumstances: A alone, both A and B, and B alone. In addition, the character "/" in this application generally indicates an "or" relationship of the successively related items.

In the embodiments of this application, the same reference numerals indicate the same components, and detailed descriptions of the same components are omitted in different embodiments for the sake of brevity. Understandably, dimensions, such as thickness, length, and width of various components in the embodiments of this application shown in the accompanying drawings, and dimensions, such as overall thickness, length, and width of an integrated apparatus are merely illustrative descriptions, but do not constitute any limitation on this application.

In this application, the term "a plurality of" refers to two or more (including two).

Coating is an integral step in the battery cell manufacturing process. A battery cell includes an electrode assembly and an electrolyte solution. The electrode assembly includes a positive electrode plate, a negative electrode plate and a separator. The battery cell works primarily by relying on shuttling of metal ions between the positive electrode plate and the negative electrode plate. The positive electrode plate includes a positive current collector and a positive active material layer. The positive active material layer is coated on a surface of the positive current collector. The positive current collector includes a positive current collection portion and a positive tab, the positive current collection portion is coated with the positive active material layer, and the positive tab is not coated with the positive active material layer. Taking a lithium-ion battery as an example, a material of the positive current collector may be aluminum, the positive active material layer includes a positive active material, the positive active material may be lithium cobaltate, lithium iron phosphate, ternary lithium, or lithium manganese, etc. The negative electrode plate includes a negative current collector and a negative active material layer. The negative active material layer is coated on a surface of the negative current collector. The negative current collector includes a negative current collection portion and a negative tab, the negative current collection portion is coated with the negative active material layer, and the negative tab is not coated with the negative active material layer. A material of the negative current collector may be copper, the negative active material layer includes a negative active material, and the negative active material may be carbon or silicon, etc. A material of the separator may be PP (polypropylene) or PE (polyethylene), etc.

In the production process of the battery cell, both the positive electrode plate and the negative electrode plate are made using a coating process. The coating process is to apply a thin layer of coating material in the form of liquid or powder to the surface of an object such as fabric, paper, metal foil or board. Exemplarily, the positive active material, a conductive agent, a binder, and a solvent are mixed and made into a thick pasty slurry, which is then uniformly, continuously, or intermittently coated on a positive current collector substrate (e.g., aluminum foil) to make a positive electrode plate.

A coating die head used in the coating process has a feed port, a discharge port and a material cavity communicating with the feed port and the discharge port. The external slurry enters the material cavity through the feed port at a certain pressure and exits through the discharge port to be coated on a substrate passing through the discharge port. The coating weight is closely related to the safety of the battery cell, which is one of the key control points for the production of the battery cell.

However, the coating weights of different models of battery cells are greatly different, slurries used by different battery cells are also different, there are different conditions in the production process, and the above conditions will lead to different pressure of the material cavity of the coating die head. For example, when the slurry is agglomerated and settles, it will lead to high pressure in the material cavity, and may even lead to seepage of the coating die head. For another example, when the viscosity of the slurry is low or high, the pressure of the material cavity will fluctuate, and the coating weight will be seriously affected. For yet another example, when the coating speed is too large or too low, the pressure of the material cavity will also be seriously affected, thus affecting the coating weight.

In conclusion, when the pressure of the material cavity is unstable, it will affect the conveying state of the slurry, and thus affect the consistency of the coating weight. Under normal conditions, when the pressure of the material cavity fluctuates, it is necessary to replace a coating die head with a suitable material cavity, or clean the slurry settling in the material cavity, or replace the slurry to solve the problem, so as to improve the quality of the electrode plates. However, this will cause serious material loss, and also reduce the efficiency of the process and increase the manufacturing cost.

In view of this, an embodiment of this application provides a coating die head with online adjustment of pressure of a material cavity. The specific solution is: one or more cavity pressure adjusting blocks 2 with adjustable volume size (that is, the material of the cavity pressure adjusting blocks 2 can expand and shrink) are added to the coating die head 100, online adjustment of the effective volume of a slurry in the material cavity 10 can be achieved by online adjustment of the volume of the material cavity 10 occupied by the cavity pressure adjusting blocks 2, and thus the effect of adjusting the pressure of the material cavity 10 can be achieved. Therefore, the problem of coating weight fluctuation caused by the size mismatch of the material cavity 10 of the coating die head 100 or the pressure fluctuation of the material cavity 10 in the production process is solved, the problems of resource waste caused by frequent replacement of the coating die head 100, or increased process cost, etc. are avoided, and the problems of serious material loss caused by cleaning the slurry settling in the material cavity 10 or replacing the slurry, etc. are avoided.

In addition, it should be noted that the coating die head 100 provided in the embodiment of this application may be used, but not limited to, for the production of electrode plates and other workpieces requiring the coating process.

The following is a detailed description of the coating die head 100 according to the embodiment of this application with reference to the accompanying drawings.

Figure 2:
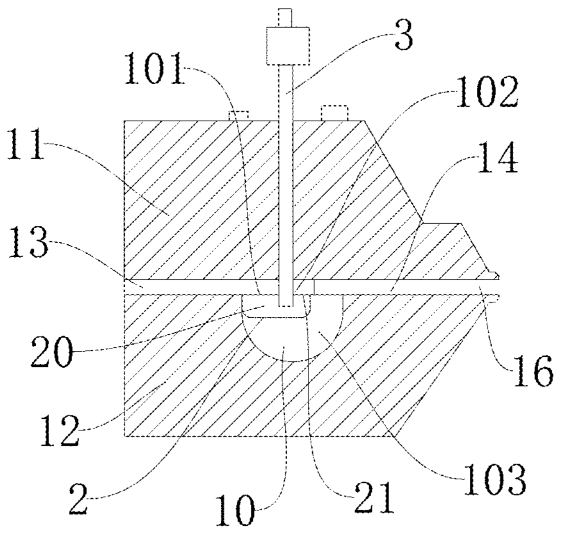
FIG. 2 is a sectional structural diagram of the coating die head according to some embodiments of this application.

As shown in FIG. 1 and FIG. 2, the coating die head 100 includes a die head body 1, cavity pressure adjusting blocks 2 and regulating assemblies 3. A material cavity 10 is arranged in the die head body 1, the cavity pressure adjusting blocks 2 are arranged in the material cavity 10, the cavity pressure adjusting blocks 2 are internally provided with cavities 20, the cavity pressure adjusting blocks 2 are configured to change a volume with a pressure change of the cavities 20, a through hole 102 is formed in the wall surface of the material cavity 10, and the regulating assemblies 3 are adapted to communicate with the cavities 20 through the through hole 102 and used for conveying fluid into the cavities 20 or extracting fluid from the cavities 20 to adjust the volume of the cavity pressure adjusting blocks 2 by changing pressure of the cavities 20.

It should be noted that the specific composition of the die head body 1 is not limited. For example, in some embodiments, combined with FIG. 1 to FIG. 2, the die head body 1 may include an upper die head 11, a lower die head 12, and a gasket 13; the material cavity 10 is formed among the upper die head 11, the lower die head 12, and the gasket 13; the gasket 13 is arranged between the upper die head 11 and the lower die head 12 so as to fit with the upper die head 11 and the lower die head 12 to form a discharge slit 14; a discharge port 16 is formed on a front side between the upper die head 11 and the lower die head 12; a feed port 15 is formed on at least one of the upper die head 11 and the lower die head 12 (for example, a feed port 15 may be formed on a back side of the lower die head 12 in combination with FIG. 3); the feed port 15 communicates with the material cavity 10; and the material cavity 10 communicates with the discharge port 16 through the discharge slit 14.

For another example, in some embodiments, the die head body 1 may include at least three dies, such as a first die, a second die, a third die, a first gasket 13 and a second gasket 13 arranged from top to bottom in sequence. A first material cavity 10 formed among the first die, the second die and the first gasket 13. A first discharge port 16 is formed between the first die and the second die. A first feed port 15 communicating with the first material cavity 10 is formed on at least one of the first die and the second die. The first gasket 13 is arranged between the first die and the second die and is fitted with the first die and the second die to form a first discharge slit 14. The first material cavity 10 communicates with the first discharge port 16 through the first discharge slit 14. A second material cavity 10 is formed among the second die, the third die and the second gasket 13. A second discharge port 16 is formed between the second die and the third die. A second feed port 15 communicating with the second material cavity 10 is formed on at least one of the second die and the third die. The second gasket 13 is arranged between the second die and the third die and is fitted with the second die and the third die to form a second discharge slit 14. The second material cavity 10 communicates with the second discharge port 16 through the second discharge slit 14.

In addition, it should be noted that the quantity of the material cavities 10 defined by the die head body 1 is not limited. For example, taking the die head body 1 including the upper die head 11, the lower die head 12 and the gasket 13 as an example, the die head body 1 may only form one material cavity 10. For another example, the die head body 1 may also form two material cavities 10, one of the two material cavities 10 is a main material cavity 10, the other is a secondary material cavity 10, the main material cavity 10 communicates with the feed port 15, the secondary material cavity 10 communicates with the discharge port 16, and the main material cavity 10 communicates with the secondary material cavity 10 through a communication path, so as to play a role of discharge buffer.

When the die head body 1 defines a plurality of material cavities 10, at least one material cavity 10 is provided with the cavity pressure adjusting block 2. For example, when the die head body 1 defines an upstream material cavity 10 (such as the main material cavity 10) and a downstream material cavity 10 (such as the secondary material cavity 10) which communicate with each other, at least one cavity pressure adjusting block 2 may be arranged in the downstream material cavity 10, which can not only effectively improve the consistency of the coating weight, but also simplify the structure, reduce cost, and improve process efficiency. Of course, this application is not limited to this, at least one cavity pressure adjusting block 2 may also be arranged in the upstream material cavity 10, which can also improve the consistency of the coating weight to a certain extent; or, at least one cavity pressure adjusting block 2 may be arranged in each material cavity 10 respectively to more fully improve the consistency of the coating weight.

Specifically, each cavity pressure adjusting block 2 is an expandable and shrinkable clastic material element. By providing the cavity pressure adjusting block 2 in the cavity 20 and adjusting the pressure of the cavity 20, the volume of the cavity pressure adjusting block 2 can be changed. For example, by increasing the pressure of the cavity 20, the cavity pressure adjusting block 2 can expand and the volume becomes larger. For another example, by reducing the pressure of the cavity 20, the cavity pressure adjusting block 2 can shrink and the volume is reduced.

In the embodiment of this application, the volume of the cavity pressure adjusting blocks 2 is changed by the regulating assemblies 3. Specifically, the regulating assemblies 3 can convey fluid into the cavities 20 of the cavity pressure adjusting blocks 2, thereby increasing the pressure of the material cavities 20 to expand the cavity pressure adjusting blocks 2 and increase the volume. The regulating assemblies 3 can also extract fluid from the cavities 20 of the cavity pressure adjusting blocks 2. Thus, the pressure of the cavities 20 is reduced, so that the cavity pressure adjusting blocks 2 shrink and the volume is reduced. Therefore, the volume of the cavity pressure adjusting blocks 2 can be adjusted online by the regulating assemblies 3.

It is worth noting that the specific composition of the regulating assembly 3 is not limited, and the manner in which the regulating assembly 3 conveys fluid into the cavity 20 or extracts fluid from the cavity 20 through the through hole 102 is not limited. For example, the regulating assembly 3 may include a pipeline inserted into the through hole 102 to convey fluid into the cavity 20 or extract fluid from the cavity 20 through the pipeline. For another example, the regulating assembly 3 may also exclude a pipeline inserted into the through hole 102 to convey fluid into the cavity 20 or extract fluid from the cavity 20 directly through the through hole 102, and so on. The specific type of "fluid" is not limited, such as gas or liquid, etc., there is no restriction here.

In the embodiment of this application, when the volume of the cavity pressure adjusting block 2 changes, the volume of the material cavity 10 in the die head body 1 occupied by the cavity pressure adjusting block 2 changes accordingly, thereby changing the effective volume of the material cavity 10 used for containing a coating material, and thus changing the pressure of the material cavity 10. It can be understood that when the volume of the cavity pressure adjusting block 2 increases, the volume of the material cavity 10 in the die head body 1 occupied by the cavity pressure adjusting block 2 increases, thereby reducing the effective volume of the material cavity 10 used for containing the coating material, and thus increasing the pressure of the cavity 10. And when the volume of the cavity pressure adjusting block 2 decreases, the volume of the material cavity 10 in the die head body 1 occupied by the cavity pressure adjusting block 2 becomes smaller, so that the effective volume of the material cavity 10 used for containing the coating material becomes larger, and thus pressure of the material cavity 10 can be reduced.

Therefore, online adjustment of volume and pressure of the material cavity 10 can be achieved through online adjustment of the volume of the cavity pressure adjusting blocks 2 by the regulating assemblies 3, and accordingly, the problem of coating weight fluctuation caused by the size mismatch of the material cavity 10 of the coating die head 100 or the pressure fluctuation of the material cavity 10 in the production process is solved, the problems of resource waste caused by frequent replacement of the coating die head 100, or increased process cost, etc. are avoided, the problems of serious material loss caused by cleaning the slurry settling in the material cavity 10 or replacing the slurry, etc. are avoided, the consistency of the coating weight is improved, and the quality of a coated product is improved.

As shown in FIG. 2, the through hole 102 is formed on a first wall surface 101 of the material cavity 10, one side wall surface of the cavity pressure adjusting block 2 facing the first wall surface 101 is a second wall surface 21, and the second wall surface 21 is fitted with the first wall surface 101 and surrounds a region where the through hole 102 is located. Therefore, since the second wall surface 21 is fitted with the first wall surface 101, and surrounds the region where the through hole 102 is located, a seepage gap formed between the through hole 102 and the cavity pressure adjusting block 2 can be effectively avoided so as to avoid the problem of seepage when the pressure of the material cavity 10 is too large.

It should be noted that "the second wall surface 21 is fitted with the first wall surface 101" means that the second wall surface 21 and the first wall surface 101 are not set at intervals, for example, the second wall surface 21 and the first wall surface 101 may be in direct contact, or indirect contact. In addition, there is no limit to the way to achieve "the second wall surface 21 is fitted with the first wall surface 101". For example, the cavity pressure adjusting block 2 may be fixed on the die head body 1 by screws, so that the second wall surface 21 presses the first wall surface 101 to achieve the fit. For another example, the second wall surface 21 may also be connected to the first wall surface 101 by bonding, welding, etc., so that the second wall surface 21 and the first wall surface 101 can be fitted, which is not described here.

In addition, it is worth noting that the shape of the second wall surface 21 is not limited, as long as it can surround the region where the through hole 102 is located, so that the shape and quantity of the cavity pressure adjusting blocks 2 can be flexibly set according to the actual situation, thereby increasing the application scope of the cavity pressure adjusting blocks 2 in the embodiment of this application.

It should be noted that the material of the cavity pressure adjusting block 2 is not limited, for example, corrosion resistant rubber, silica gel and other expandable or shrinkable and high-strength materials can be selected. Therefore, the better cavity pressure adjustment effect can be achieved, the service life is long, and the better sealing and seepage prevention effect can be achieved.

The applicant finds that if a spherical air bag is arranged in the material cavity, the spherical air bag and the first wall surface cannot be fitted, and a seepage gap around the through hole will be formed between the spherical air bag and the first wall surface, and will change with the volume change of the spherical air bag, and seepage is easily caused from the seepage gap when the pressure of the material cavity is too large. The cavity pressure adjusting block 2 in the embodiment of this application is provided with the second wall surface 21 that is fitted with the first wall surface 101 and surrounds the region where the through hole 102 is located, so that the seepage gap can be effectively eliminated, and accordingly the problem of seepage caused by too large pressure of the material cavity 10 is alleviated and thus the process optimization rate can be improved.

In some embodiments of this application, the cavity pressure adjusting blocks 2 are detachably connected to the die head body 1. Therefore, different cavity pressure adjusting blocks 2 can be replaced according to requirements to meet different actual requirements. Moreover, since the cavity pressure adjusting blocks 2 can be disassembled and assembled separately, it is also conducive to maintenance. Moreover, the cavity pressure adjusting blocks 2 can be assembled and used on the same or different die bodies 1, thereby effectively reducing the process cost.

Specifically, the length, width, height, curvature and other parameters of different cavity pressure adjusting blocks 2 may be designed to be different, so that different coated products can optionally be matched with different, or different combinations of cavity pressure adjusting blocks 2, so as to meet the adjustment effects required by various coated products. For example, the cross section of the cavity pressure adjusting block 2 may be polygonal (such as quadrilateral, triangular, pentagonal, etc.), or fan-shaped (such as semicircular, sub-arc-fan-shaped, etc.), or in an irregular shape, etc.

Figure 5:
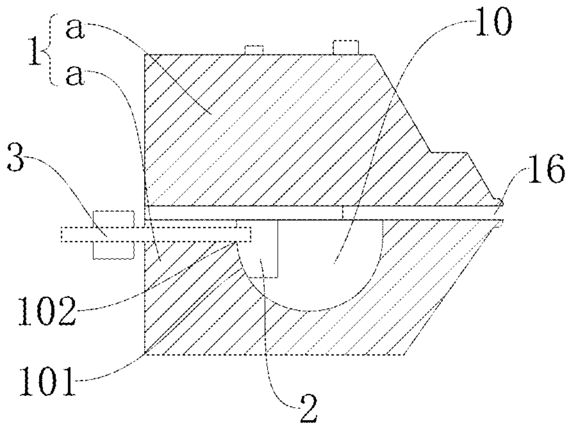
FIG. 5 is a sectional structural diagram of the coating die head according to some embodiments of this application.
Figure 6:
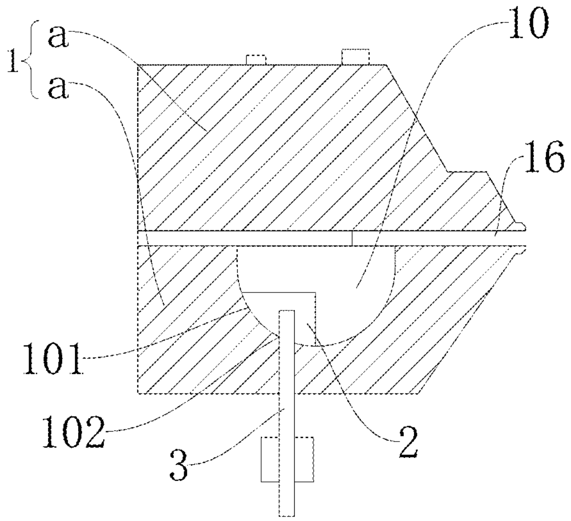
FIG. 6 is a sectional structural diagram of the coating die head according to some embodiments of this application.

In addition, it is understood that in order to make the second wall surface 21 and the first wall surface 101 be fitted effectively, the second wall surface 21 may be set to match the shape of the first wall surface 101, such as a plane structure, or a curved structure. In addition, the shape of the first wall surface 101 may be determined according to the shape of the material cavity 10 and the opening position of the through hole 102. For example, the first wall surface 101 may be a wall surface of a die head unit a (for example, an embodiment shown in FIG. 5 or FIG. 6), may also be a wall surface of the gasket 13 (for example, an embodiment shown in FIG. 2), and so on. In addition, the first wall surface 101 may be a plane structure (as shown in FIG. 2), or a curved structure (as shown in FIG. 5 and FIG. 6), and so on, which is not described here.

It should be noted that the cavity pressure adjusting blocks 2 and the die head body 1 may be detachably connected in any way, and there may be a variety of ways, such as snap connection or thread connection. For example, in some specific examples, the cavity pressure adjusting blocks 2 and the die head body 1 may be detachably connected by a threaded connector arranged on the first wall surface 101 and the second wall surface 21, where the threaded connector may be a screw or bolt, etc. It is worth noting that the threaded connector may be arranged in a penetrating manner in any direction, for example, it may penetrate from the outside of the die head body 1 to the inside, or may also penetrate from the inside of the die head body 1 to the outside, and so on.

Therefore, by using the threaded connector to achieve detachable connection, the connection reliability can be ensured, the cavity pressure adjusting blocks 2 are not easy to fall off, the fitting effect of the first wall surface 101 and the second wall surface 21 is ensured, and the problem of seepage is effectively avoided. Moreover, since the threaded connector is arranged on the first wall surface 101 and the second wall surface 21 in a penetrating manner, it can not only effectively ensure the fitting effect of the first wall surface 101 and the second wall surface 21, but also make the other wall surfaces of the cavity pressure adjusting block 2 except the second wall surface 21 be used for expansion and shrinkage, which is conducive to achieving the adjustment of the pressure of the material cavity 10, and the shape and position of the cavity pressure adjusting blocks 2 may be set flexibly. In addition, by adoption of the connection of the threaded connector, it is conducive to the disassembly and replacement of the cavity pressure adjusting blocks 2, and damage to structural parts (such as fasteners, etc.) caused by disassembly and replacement is not easily caused.

Figure 7:
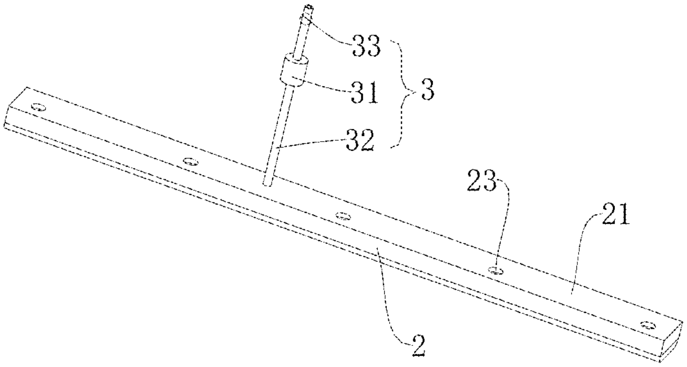
FIG. 7 is an assembly diagram of a cavity pressure adjusting block and a regulating assembly according to some embodiments of this application.

It is understood that in order to meet the requirement that the threaded connector is arranged on the second wall surface 21 in a penetrating manner, matching holes 23 for arranging the threaded connector in a penetrating manner may be provided on the second wall surface 21 (for example, as shown in FIG. 7).

It should be noted that the quantity of cavity pressure adjusting blocks 2 and the distribution position of the cavity pressure adjusting blocks 2 in the material cavity 10 are not limited.

For example, in some embodiments of this application, as shown in FIG. 1 and FIG. 2, a plurality of cavity pressure adjusting blocks 2 are provided and arranged in sequence along a length direction (a left-right direction shown in FIG. 1) of the material cavity 10. Therefore, the volume of each cavity pressure adjusting block 2 is relatively small, the regulating assemblies 3 can easily adjust the volume change of each cavity pressure adjusting block 2, and adjustment precision is high.

In addition, when the plurality of cavity pressure adjusting blocks 2 can be adjusted separately, the cavity pressure adjusting blocks 2 at different positions can be adjusted separately, so that the pressure at each position of the material cavity 10 can meet the coating requirements. Or, when the volume of each position of the material cavity 10 is inconsistent, different cavity pressure adjusting blocks 2 can be designed by matching at different positions, so that the pressure at each position of the material cavity 10 can meet the coating requirements.

Figure 3:
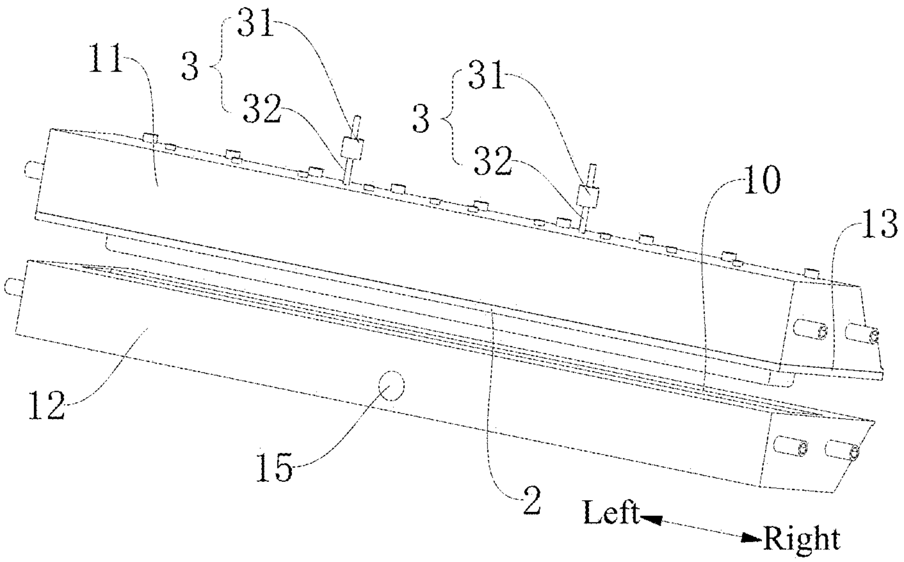
FIG. 3 is an exploded structural diagram of the coating die head according to some embodiments of this application.

For another example, in some embodiments of this application, as shown in FIG. 3, one cavity pressure adjusting block 2 is provided, and a length direction (a left-right direction shown in FIG. 3) of the cavity pressure adjusting block 2 is parallel with a length direction of the material cavity 10 ("parallel" here as a broad understanding, can be absolute parallel or roughly parallel). Therefore, the cavity pressure adjusting block 2 is simple in structure, convenient to machine, and convenient to assemble, disassemble and replace, and can reduce cost.

Figure 4:
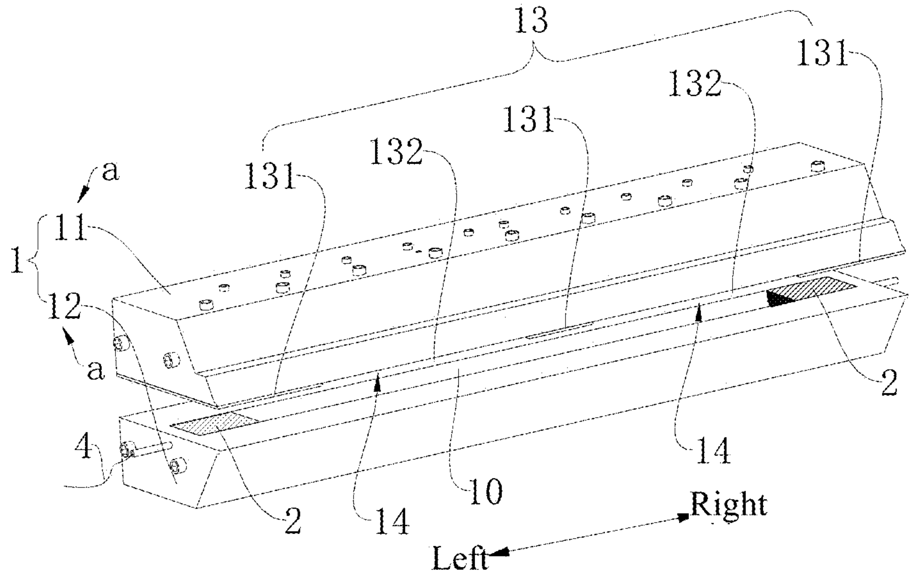
FIG. 4 is an exploded structural diagram of the coating die head according to some embodiments of this application.

For yet another example, in some embodiments of this application, as shown in FIG. 4, cavity pressure adjusting blocks 2 are arranged at two ends (for example, left and right end portions shown in FIG. 4) of the material cavity 10 along the length direction. Therefore, for the solution where the feeding position and discharging position are not located at both end portions of the length, the setting positions of the cavity pressure adjusting blocks 2 have little influence on the feeding and discharging, which can make the overall pressure change consistency of the material cavity 10 better and improve the flow uniformity of the slurry in the material cavity 10. Moreover, the cavity pressure adjusting blocks 2 arranged at the end portions of the length are convenient to assemble and disassemble.

In some embodiments of this application, as shown in FIG. 1 to FIG. 3, the die head body 1 has a discharge port 16 and a feed port 15 communicating with the material cavity 10, and when the cavity pressure adjusting block 2 is configured to expand to a limit state, a material passing space 103 communicating with the feed port 15 and the discharge port 16 is still provided between the cavity pressure adjusting block 2 and the material cavity 10. Therefore, the problem of blockage can be avoided.

It should be noted that the "limit state" is the maximum expansion state of the cavity pressure adjusting block 2 controlled by the regulating assembly 3, not the maximum state of the cavity pressure adjusting block 2 being able to expand.

The applicant finds that if an air bag with large expansion is arranged in the material cavity, the air bag is easy to fit with the wall surface of the material cavity after expanding, blocking a flow path, obstructing the fluidity of the slurry, resulting in the slurry forming a large dead zone in the material cavity, and affecting the uniformity of the coating weight. Specifically, the slurry flow state in the material cavity is a laminar flow state. When the air bag blocks part of the slurry to flow from the feed port to the discharge port, the slurry cannot flow uniformly in the material cavity as a whole since local slurry does not flow, resulting in local gel settling and other phenomena, resulting in poor pressure uniformity in the material cavity and affecting the consistency of the coating weight.

However, according to the cavity pressure adjusting block 2 of this application, since the cavity pressure adjusting block 2 is configured to expand to a limit state, the material passing space 103 communicating with the feed port 15 and the discharge port 16 is still provided between the cavity pressure adjusting block 2 and the material cavity 10. Therefore, the problem of blockage of the flow path can be avoided, the flow uniformity of the slurry in the material cavity 10 is improved, the phenomenon of local gel settling is alleviated, and the consistency of the coating weight is improved.

In some embodiments of this application, as shown in FIG. 5 and FIG. 6, the die head body 1 has a discharge port 16 communicating with the material cavity 10, the cavity pressure adjusting blocks 2 are arranged on one side inside the material cavity 10, the side is away from the discharge port 16, or the cavity pressure adjusting blocks 2 are arranged in a middle position of the material cavity 10 (as shown in FIG. 2). Therefore, the influence of the cavity pressure adjusting blocks 2 on the discharge uniformity can be reduced, and thus the consistency of the coating weight is improved. It should be noted that the "middle position of the material cavity 10" refers to the middle position along a discharge direction, not limited to the central section, as long as it is close to the central section.

In some embodiments of this application, as shown in FIG. 4, the die head body 1 includes a plurality of die head units a (for example, an upper die head 11 and a lower die head 12 shown in FIG. 4) and a gasket 13 arranged between each two adjacent die head units a, the gasket 13 includes a sheet body portion 131 (solid region) and a notch portion 132 (hollowed-out region), discharge slits 14 are formed between the gasket 13 and the corresponding two die head units a through the notch portion 132, and the cavity pressure adjusting blocks 2 are arranged corresponding to the sheet body portion 131. Therefore, the provision of the cavity pressure adjusting blocks 2 can recede the discharge slits 14, and thus the influence of the cavity pressure adjusting blocks 2 on the discharge uniformity can be reduced, and the consistency of the coating weight is improved.

Of course, this application is not limited to this, for example, in other embodiments of this application, the cavity pressure adjusting blocks 2 may also be arranged corresponding to the notch portion 132; or, a part of the cavity pressure adjusting blocks 2 are arranged corresponding to the notch portion 132 while a part of the cavity pressure adjusting blocks 2 are arranged corresponding to the sheet body portions 131, etc., which is not described here.

In some embodiments of this application, as shown in FIG. 2 and FIG. 7, the regulating assembly 3 includes a pressure regulator 31 and a flow channel tube 32, the pressure regulator 31 is arranged on the flow channel tube 32, and the flow channel tube 32 is arranged on the through hole 102 in a penetrating manner and communicates with the cavity 20. Therefore, the regulating assemblies 3 are simple in structure and low in cost, the regulating assembly can conveniently communicate with the cavity 20 of the cavity pressure adjusting block 2 by provision of the flow channel tube 32 arranged on the through hole 102 in a penetrating manner, the assembling difficulty of the regulating assemblies 3 is reduced, and the problem of seepage can be further alleviated.

For example, the regulating assembly 3 may be connected to a pneumatic regulator system or a hydraulic regulator system, so that the regulating assembly 3 can convey liquid or gas into or extract liquid or gas from the cavity 20 of the cavity pressure adjusting block 2 through the flow channel tube 32, and the pressure regulator 31 can adjust the internal pressure of the cavity pressure adjusting block 2 to control the volume of the cavity pressure adjusting block 2.

In some embodiments, each cavity pressure adjusting block 2 is correspondingly connected to at least one flow channel tube 32. Therefore, each cavity pressure adjusting block 2 can have an effective and rapid volume adjustment effect.

For example, in a specific example, as shown in FIG. 1, a plurality of flow channel tubes 32 and a plurality of cavity pressure adjusting blocks 2 may be provided and arranged in a one-to-one correspondence manner, that is, the flow channel tubes 32 and the cavity pressure adjusting blocks 2 are the same in quantity and are arranged in a one-to-one correspondence manner. Therefore, the structure is simple, and design is convenient, so that each cavity pressure adjusting block 2 can have an effective and rapid volume adjustment effect.

For another example, in a specific example, as shown in FIG. 3, at least one cavity pressure adjusting block 2 is correspondingly connected to a plurality of flow channel tubes 32. Therefore, the cavity pressure adjusting block 2 with a large volume can have a more effective and rapid volume adjustment effect.

Of course, this application is not limited to this. For example, in other embodiments of this application, the regulating assembly further 3 includes a communicating tube, and the communicating tube is arranged in the material cavity 10 and communicates with the cavities 20 of the plurality of cavity pressure adjusting blocks 2. At this time, only several cavity pressure adjusting blocks 2 may be connected to the flow channel tube 32, and the rest of the cavity pressure adjusting blocks 2 are connected to the above several cavity pressure adjusting blocks 2 through communicating tubes, so that the adjustment of all the cavity pressure adjusting blocks 2 can also be achieved. Therefore, the quantity of pressure regulators 31 and the quantity of flow channel tubes 32 can be reduced, the control is simplified, and the installation space required for the arrangement of the pressure regulators 31 and the flow channel tubes 32 can be saved.

It should be noted that the quantity of the pressure regulators 31 and the quantity of the cavity pressure adjusting blocks 2 may or may not correspond to each other, for example, each cavity pressure adjusting block 2 may correspond to one pressure regulator 31, so as to achieve the online adjustment of each cavity pressure adjusting block 2; or, the plurality of cavity pressure adjusting blocks 2 may correspond to one pressure regulator 31 at the same time to achieve synchronous online adjustment of the plurality of cavity pressure adjusting blocks 2.

In some embodiments, as shown in FIG. 1, when the flow channel tubes 32 and the cavity pressure adjusting blocks 2 are both plural in number and are arranged in a one-to-one correspondence manner, the pressure regulators 31 are plural in number and are arranged in a one-to-one correspondence with the flow channel tubes 32. Therefore, individual adjustment of each cavity pressure adjusting block 2 can be achieved, so as to meet the requirements of the cavity pressure adjusting blocks 2 at different positions to perform targeted adjustment for the pressure characteristics of the corresponding positions of the material cavity 10, and further improve the consistency of the coating weight.

Of course, this application is not limited to this. For example, in other embodiments, when the flow channel tubes 32 and the cavity pressure adjusting blocks 2 are both plural in number and are arranged in a one-to-one correspondence manner, at least two of the flow channel tubes 32 may also be arranged corresponding to the same pressure regulator 31. Therefore, simultaneous adjustment of at least two of the cavity pressure adjusting blocks 2 can be achieved, and thus control is simplified, and cost is reduced.

Figure 8:
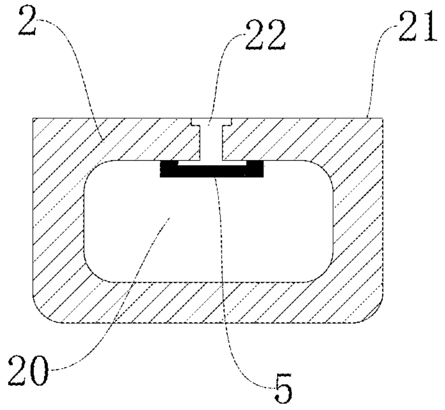
FIG. 8 is an assembly diagram of the cavity pressure adjusting block and an anti-reverse-flow element according to some embodiments of this application.

In some embodiments, as shown in FIG. 2 and FIG. 8, the cavity pressure adjusting block 2 has an opening 22 arranged corresponding to the through hole 102, the opening 22 communicates with the cavity 20, the opening 22 is provided with an anti-reverse-flow element 5, an end portion of the flow channel tube 32 is adapted to extend into the cavity 20 through the anti-reverse-flow element 5 and the opening 22, and the anti-reverse-flow element 5 is used for closing the opening 22 when the flow channel tube 32 is withdrawn from the opening 22. Therefore, by provision of the anti-reverse-flow element 5, fluid can be prevented from overflowing from the opening 22, stable pressure of the cavity 20 is ensured, the pressure adjustment effect for the material cavity 10 is ensured, and the pressure of the material cavity 10 can be stable.

In some specific examples, the anti-reverse-flow element 5 is designed according to the pressure reverse sealing principle, for example, the anti-reverse-flow element 5 may be a rubber pad. When the flow channel tube 32 extends into the opening 22, the cavity 20 of the cavity pressure adjusting block 2 keeps a communicating state with the flow channel tube 32, and the pressure regulator 31 is controlled to adjust the pressure in the cavity pressure adjusting block 2, When the flow channel tube 32 exits from the opening 22, the internal pressure of the cavity pressure adjusting block 2 is large, which will exert outward force on the rubber pad, resulting in the rubber pad returning to a sealed state.

Of course, this application is not limited to this, the anti-reverse-flow element 5 may also not be a rubber pad, for example, it may be an opening and closing mechanism, and a control system can control the opening and closing mechanism to achieve the anti-reverse-flow effect of the anti-reverse-flow element 5, which is not described here.

In some embodiments, as shown in FIG. 7 and FIG. 8, the flow channel tube 32 is provided with a pressure gauge 33. Therefore, when the flow channel tube 32 is inserted into the opening 22, the pressure in the cavity pressure adjusting block 2 can be monitored in real time through the pressure gauge 33, which is conducive to the effective adjustment of the volume of the cavity pressure adjusting block 2.

In some embodiments of this application, the coating die head 100 further includes: a detection apparatus, including a pressure sensor 4 used for detecting pressure of the material cavity 10. Therefore, the pressure of the material cavity 10 is detected by the pressure sensor 4, which is conducive to adjusting the volume of the cavity pressure adjusting block 2, thereby being conducive to online adjustment of the pressure of the material cavity 10.

It is worth noting that the composition of the detection apparatus is not limited to this, for example, it may also include a temperature sensor, etc., which is not described here.

It should be noted that the quantity, distribution position and installation mode of the pressure sensor 4 can be specified according to actual requirements, so as to meet different actual requirements. For example, pressure sensors 4 may be arranged at any position on the upper, lower, left, right, front or back of the die head body 1.

For example, in some embodiments, as shown in FIG. 4, at least one pressure sensor 4 is installed on the cavity pressure adjusting block 2 and a sensing head of the pressure sensor 4 is exposed to the material cavity 10. Therefore, impacting the sensing head of the pressure sensor 4 caused by the volume change of the cavity pressure adjusting block 2 can be avoided, so as to ensure the accuracy of pressure measurement of the pressure sensor 4. Moreover, the processing of the die head body 1 can be simplified to meet the installation requirements of the pressure sensor 4.

Of course, this application is not limited to this, for example, the cavity pressure adjusting block 2 may also be directly arranged on the die head body 1, and located near the cavity pressure adjusting block 2, so that the pressure adjustment for the material cavity 10 can be achieved more effectively.

In some embodiments, the detection apparatus may include a plurality of pressure sensors 4 arranged at intervals along the length direction of the material cavity 10. Therefore, pressure detection can be performed on a plurality of positions along the entire length of the material cavity 10 to monitor the pressure change conditions of the material cavity 10 from a plurality of spatial positions, which is conducive to determining the adjustment parameters, ensuring the uniform pressure of the material cavity 10, and improving the consistency of the coating weight.

In an embodiment, the detection apparatus is electrically connected to the regulating assembly 3, so that the regulating assembly 3 can perform corresponding adjustment according to the pressure of the material cavity 10 detected by the pressure sensor 4. Therefore, automatic pressure adjustment can be achieved, manual operation is eliminated, and the consistency of the coating weight is conveniently and reliably ensured. For example, a corresponding algorithm can be set, and the background can achieve the automatic adjustment of the regulating assembly 3 according to the detection result of the pressure sensor 4 through calculation.

For example, in some embodiments, the material cavity 10 is divided into a plurality of regions, each region is correspondingly provided with at least one pressure sensor 4, and each region is correspondingly provided with at least one cavity pressure adjusting block 2. Therefore, the regulating assembly 3 can adjust the cavity pressure adjusting block 2 on the corresponding region according to the pressure sensor 4 of each region, and thus the volume of each cavity pressure adjusting block 2 can be adjusted specifically to achieve the stable and uniform effect of controlling the pressure of the material cavity 10.

Of course, this application is not limited to this, the detection apparatus and the regulating assembly 3 may also have no electrical connection relationship. When the material cavity 10 has cavity pressure fluctuation, the regulating assembly 3 may be manually operated to adjust the volume of the cavity pressure adjusting block 2, so as to achieve the effect of controlling the pressure stability of the material cavity 10.

As mentioned above, the installation position of the cavity pressure adjusting block 2 is not limited, and an expansion direction of the cavity pressure adjusting block 2 may be a direction away from the second wall surface 21. For example, when the cavity pressure adjusting block 2 is fixed on the upper die head 11, the cavity pressure adjusting block 2 expands towards the direction of the lower die head 12 when the pressure of the cavity 20 increases, and the cavity pressure adjusting block 2 shrinks towards the direction of the upper die head 11 when the pressure of the cavity 20 decreases. When the cavity pressure adjusting block 2 is fixed to the lower die head 12, the cavity pressure adjusting block 2 expands towards the direction of the upper die head 11 when the pressure of the cavity 20 increases, and the cavity pressure adjusting block 2 shrinks towards the direction of the lower die head 12 when the pressure of the cavity 20 decreases. When the cavity pressure adjusting block 2 is fixed at the left end of the material cavity 10, the cavity pressure adjusting block 2 expands towards the direction of the right end when the pressure of the cavity 20 increases, and the cavity pressure adjusting block 2 shrinks towards the direction of the left end when the pressure of the cavity 20 decreases. When the cavity pressure adjusting block 2 is fixed at the right end of the material cavity 10, the cavity pressure adjusting block 2 expands towards the direction of the left end when the pressure of the cavity 20 increases, and the cavity pressure adjusting block 2 shrinks towards the direction of the right end when the pressure of the cavity 20 decreases.

Figure 9:
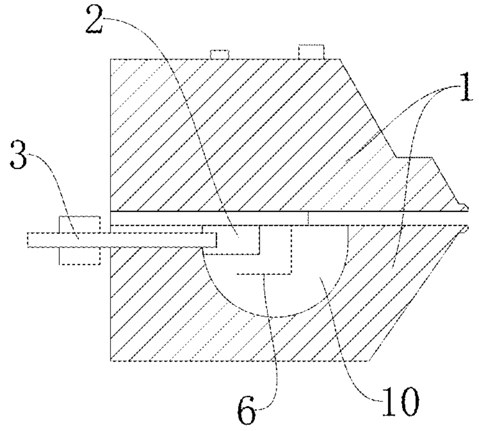
FIG. 9 is a sectional structural diagram of the coating die head according to some embodiments of this application.

In some embodiments, as shown in FIG. 9, the coating die head 100 further includes: a guide member 6, and the guide member 6 is arranged in the material cavity 10 and used for guiding the cavity pressure adjusting block 2 to expand directionally. Therefore, the cavity pressure adjusting block 2 can expand or shrink along a set direction by provision of the guide member 6, so as to meet different design requirements. For example, the expansion direction of the cavity pressure adjusting block 2 is guided to make distribution of the slurry in the material cavity 10 be more conducive to the coating process.

For example, the cavity pressure adjusting block 2 may be used with the guide member 6 to make the cavity pressure adjusting block 2 expand along the length direction of the material cavity 10, the up and down direction, or toward the direction of the discharge port 16, etc., which is not described here.

In conclusion, according to the coating die head 100 of the embodiments of this application, at least one shrinkable or expandable cavity pressure adjusting block 2 is added into the material cavity 10, the effective volume of the material cavity 10 can be changed by controlling the pressure in the cavity pressure adjusting block 2 to change the volume of the cavity pressure adjusting block 2, online adjustment of the space of the material cavity 10 is achieved, so as to ensure that the pressure of the material cavity 10 can be adjusted online to a target value, and accordingly the problem of pressure fluctuation of the material cavity 10 is solved, and thus the problem of coating weight fluctuation is solved. Therefore, the problem of resource waste caused by replacing the whole coating die head 100, or disassembling and washing the coating die head 100, etc. when the pressure of the material cavity 10 is not matched is effectively avoided, and the manufacturing cost can be effectively reduced.

The quantity and type (including size, shape, etc.) of the cavity pressure adjusting blocks 2 can be configured according to the design type of the die head body 1, so as to increase the adjustable pressure range of the cavity 10 through the better matching design of the cavity pressure adjusting blocks 2 and the material cavity 10. For example, the cavity pressure adjusting blocks 2 may be arranged on at least one of the upper side of the material cavity 10, the lower side of the material cavity 10, the left side of the material cavity 10, the right side of the material cavity 10, or the position away from the discharge port 16, so as to ensure that the cavity 10 has a large pressure adjusting ability.

Moreover, the cavity pressure adjusting blocks 2 can be disassembled and assembled separately, which is conducive to replacement and maintenance, and simpleness and high efficiency are achieved. Moreover, the cavity pressure adjusting blocks 2 can be assembled and used on the same or different die bodies 1, thereby effectively reducing the process cost.

In addition, by providing the pressure sensor 4, the pressure of the material cavity 10 can be monitored online to adjust the pressure of the material cavity 10, so that the regulating assemblies 3 can automatically adjust the pressure of the material cavity 10 to the target cavity pressure according to the pressure fluctuation condition of the material cavity 10.

In addition, this application further provides a piece of coating equipment using the coating die head described above, which can effectively improve the consistency of the coating weight, reduce the production cost and improve the process efficiency.

It is understood that coating rollers and other components of the piece of coating equipment as well as the operations according to the embodiments of this application are known to a person of ordinary skill in the art and are not described in detail here.

It is hereby noted that to the extent that no conflict occurs, the embodiments of this application and the features in the embodiments may be combined with each other.

The above describes various embodiments of this application, and is not intended to limit this application, and this application is subject to various changes and variations for a person skilled in the art. Any modifications, equivalent substitutions, and improvements made without departing from the spirit and principles of this application still fall within the protection scope of this application.

What is claimed is:

1. A coating die head, comprising:

a die head body, a material cavity being arranged in the die head body, and a first wall surface of the material cavity having a through hole;

at least one cavity pressure adjusting block, the at least one cavity pressure adjusting block being arranged in the material cavity, the at least one cavity pressure adjusting block internally comprising a cavity, the at least one cavity pressure adjusting block being configured to change a volume with a pressure change of the cavity, one side wall surface of the at least one cavity pressure adjusting block facing towards the first wall surface being a second wall surface, and the second wall surface being fitted with the first wall surface and surrounding a region where the through hole is located;

a regulating assembly, the regulating assembly comprising at least one pressure regulator and at least one flow channel tube, the at least one pressure regulator being arranged on the at least one flow channel tube, the at least one flow channel tube hole in a penetrating manner and communicates with the cavity through the through hole, the at least one pressure regulator being used for conveying liquid fluid into the cavity or extracting liquid fluid from the cavity and adjusting the volume of the at least one cavity pressure adjusting block by changing an internal pressure of the cavity; and a detection apparatus electrically connected to the regulating assembly and comprising at least one pressure sensor, wherein the at least one pressure sensor is installed on the at least one cavity pressure adjusting block, and a sensing head of the pressure sensor is exposed to the material cavity, the regulating assembly performs a corresponding adjustment of the volume of the at least one cavity pressure adjusting block according to the pressure of the material cavity detected by the pressure sensor.

2. The coating die head according to claim 1, wherein the at least one cavity pressure adjusting block is detachably connected to the die head body by a threaded connector arranged on the first wall surface and the second wall surface in a penetrating manner.

3. The coating die head according to claim 1, wherein the at least one cavity pressure adjusting block comprises a plurality of cavity pressure adjusting blocks that are arranged in sequence along a length direction of the material cavity.

4. The coating die head according to claim 1, wherein the at least one cavity pressure adjusting block is a single cavity pressure adjusting block of the coating die head, and a length direction of the cavity pressure adjusting block is parallel with a length direction of the material cavity.

5. The coating die head according to claim 1, wherein the at least one cavity pressure block comprises a plurality of cavity pressure adjusting blocks that are arranged at two ends of the material cavity along a length direction respectively.

6. The coating die head according to claim 1, wherein the die head body has a discharge port and a feed port communicating with the material cavity, and when the at least one cavity pressure adjusting block expands to a limit state, a material passing space communicating with the feed port and the discharge port is located between the at least one cavity pressure adjusting block and the material cavity.

7. The coating die head according to claim 1, wherein the die head body comprises a discharge port communicating with the material cavity, the at least one cavity pressure adjusting block is arranged on one side inside the material cavity, the side is away from the discharge port, or the at least one cavity pressure adjusting block is arranged in a middle position of the material cavity.

8. The coating die head according to claim 1, wherein the die head body comprises a plurality of die head units and a gasket arranged between each two adjacent die head units, the gasket comprises a sheet body portion and notch portion discharge slits are formed between the gasket and the corresponding two die head units through the notch portion, and the at least one cavity pressure adjusting block is arranged corresponding to the sheet body portion.

9. The coating die head according to claim 1, wherein the at least one cavity pressure adjusting block comprises a plurality of cavity pressure adjusting blocks, the at least one flow channel tube comprises a plurality of flow channel tubes, and each of the plurality of cavity pressure adjusting blocks is correspondingly connected to at least one of the plurality of flow channel tubes.

10. The coating die head according to claim 9, wherein the plurality of flow channel tubes and the plurality of cavity pressure adjusting blocks are arranged in a one-to-one correspondence manner.

11. The coating die head according to claim 10, wherein the at least one pressure regulators comprises a plurality of pressure regulators arranged in a one-to-one correspondence with the plurality of flow channel tubes, or wherein at least two of the plurality of flow channel tubes are arranged corresponding to one of the plurality of the pressure regulators regulator.

12. The coating die head according to claim 1, wherein the regulating assembly further comprises a communicating tube, the at least one cavity pressure adjusting block comprises a plurality of cavity pressure adjusting blocks, and the communicating tube is arranged in the material cavity and communicates with the cavities of the plurality of cavity pressure adjusting blocks.

13. The coating die head according to claim 9, wherein the at least one cavity pressure adjusting block has an opening arranged corresponding to the through hole, the opening communicates with the cavity, the opening comprises an anti-reverse-flow element, the anti-reverse-flow element is a rubber pad placed in the cavity, an end portion of the at least one flow channel tube is adapted to extend into the cavity through the anti-reverse-flow element and the opening, and the anti-reverse-flow element closes the opening when the at least one flow channel tube is withdrawn from the opening.

14. The coating die head according to claim 9, wherein the at least one flow channel tube comprises a pressure gauge.

15. The coating die head according to claim 1, further comprising:

wherein the at least one pressure sensor comprises a plurality of pressure sensors arranged at intervals along a length direction of the material cavity.

16. The coating die head according to claim 15, wherein the material cavity is divided into a plurality of regions, each region corresponds to at least one of the plurality of pressure sensors, the at least one cavity pressure adjusting block comprises a plurality of cavity pressure adjusting blocks, and each region corresponds to at least one of the plurality of cavity pressure adjusting blocks.

17. The coating die head according to claim 1, further comprising:

a guide member, the guide member being arranged in the material cavity and used for guiding the at least one cavity pressure adjusting block to expand in a set direction of the guide member, the set direction is a length direction of the material cavity or an up-and-down direction of the material cavity, wherein the at least one cavity pressure adjusting block is a rubber member or a silica gel member.

18. A piece of coating equipment, comprising a coating die head, the coating die head comprising:

a die head body, a material cavity being arranged in the die head body, and a first wall surface of the material cavity having a through hole;

at least one cavity pressure adjusting block, the at least one cavity pressure adjusting block being arranged in the material cavity, the at least one cavity pressure adjusting block internally comprising a cavity, the at least one cavity pressure adjusting block being configured to change a volume with a pressure change of the cavity, one side wall surface of the at least one cavity pressure adjusting block facing towards the first wall surface being a second wall surface, and the second wall surface being fitted with the first wall surface and surrounding a region where the through hole is located;

a regulating assembly, the regulating assembly comprising at least one pressure regulator and at least one flow channel tube, the at least one pressure regulator being arranged on the at least one flow channel tube, the at least one flow channel tube being arranged on the through hole in a penetrating manner and communicates with the cavity through the through hole, the at least one pressure regulator being used for conveying liquid fluid into the cavity or extracting liquid fluid from the cavity and adjusting the volume of the at least one cavity pressure adjusting block by changing an internal pressure of the cavity; and a detection apparatus electrically connected to the regulating assembly and comprising at least one pressure sensor, wherein the at least one pressure sensor is installed on the at least one cavity pressure adjusting block, and a sensing head of the pressure sensor is exposed to the material cavity, the regulating assembly performs a corresponding adjustment of the volume of the at least one cavity pressure adjusting block according to the pressure of the material cavity detected by the pressure sensor.

* * * * *